Figure 1:
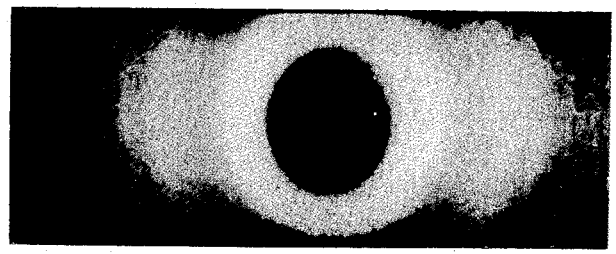

United States Patent Office 2,995,589
Patented Aug. 8, 1961

2,995,589
PROCESS FOR THE PREPARATION OF CRYSTALLINE ZINC - ETHYLENE - BIS - DITHIOCARBAMATE AND PRODUCT OBTAINED
Sabino Leghissa, Busto Arsizio, Italy, assignor to Montecatini, Societa Generale per l'Industria Mineraria e Chimica, Milan, Italy, a corporation of Italy
Filed Oct. 3, 1957, Ser. No. 688,024
10 Claims. (Cl. 260—429.9)

This application which is a continuation-in-part of application Serial No. 588,213 of May 31, 1956, subsequently abandoned, relates to a new process of preparing crystalline zinc-ethylene-bis-dithiocarbamate and to the product obtained thereby.

Salts of dithiocarbamic acids, such as those of dimethyldithiocarbamic acid, diethyldithiocarbamic acid and ethylene-bis-dithiocarbamic acid, possess a very high fungicidal activity and have been widely used in the past to control several cryptogamic crop diseases.

Methods hitherto used in making salts of dithiocarbamic acid were generally based on the preparation of the soluble alkaline and alkaline-earth salts of dithiocarbamic acid, followed by substitution of the alkaline and alkaline-earth cations with a polyvalent metal. The double-exchange reaction is caried out in a homogeneous aqueous phase by adding a soluble salt of the polyvalent metal to the aqueous solution of the alkaline or alkaline-earth dithiocarbamate.

Of these compounds, zinc-ethylene-bis-dithiocarbamate made by reacting zinc chloride in aqueous solution with a solution of sodium ethylene-bis-dithiocarbamate has become the most important and the most widely used phytotherapeutic agent. However, if prepared in this manner, the resulting bis-dithiocarbamate is obtained in form of an amorphous colloidal precipitate which is not stable and, therefore, not as suitable for agricultural purposes as would be desirable.

According to this invention, zinc-ethylene-bis-dithiocarbamate is obtained which, being characterized by a crystalline structure, proves to be practically water-insoluble and far more stable than the amorphous compound of the prior art.

It is, therefore, one object of the present invention to provide methods of preparing crystalline zinc-ethylene-bis-dithiocarbamate.

It is another object of the invention to provide crystalline zinc-ethylene-bis-dithiocarbamate as a phytotherapeutic compound.

These and other objects and advantages of the present invention will appear more clearly from the herein-following detailed description and the appended claims.

The process of this invention, which comprises reacting an aqueous solution of ammonium ethylene dithiocarbamate with a solid, insoluble metal oxide, hydrated oxide or hydroxide, and results in a water-insoluble, crystalline salt of dicarbamic acid may be illustrated by the following equation:

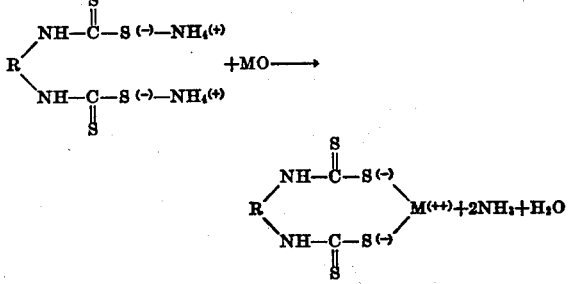

The reaction is based on the particular ability of the ammonium-ion, present in the ammonium dithiocarbamate solution, of forming unstable soluble complexes with some metal oxides.

The reaction also takes place if the formation of the soluble ammonium dithiocarbamate is carried out in the presence of the metal oxide. In this case, instead of adding to the metal oxide or hydrated oxide or hydroxide suspension a previously prepared solution of ammonium dithiocarbamate, the materials necessary for the formation of ammonium dithiocarbamate are added to the suspension.

The particle size of the metal oxide or hydroxide used in the reaction should be within a range of 1 to 20 microns to enhance the reactivity thereof. In order to avoid the formation of a so-called "ring on the wall" within the reactor, a dispersing agent, such as lignin sulfonate or a non-ionic surface active agent is preferably added to aid in the dispersion of the metal oxide or hydroxide in the aqueous solution.

We have also found that it is possible to vary the physico-chemical properties (e.g., particle size) of the dithiocarbamates obtained, by adding varying amounts of ammonium hydroxide to the reaction system. This method offers substantial advantages, because the lower reaction rate, due to the heterogeneous system in accordance with the present invention, permits a better control of the properties of the final product.

This results in a technologically simplified process, especially as far as the filtration, washing and drying steps are concerned. The economical advantages of this new method are based not only on the use of metal oxides, hydrated oxides or hydroxides which are lower in price than the corresponding soluble salts, but also on the possibility of recovering ammonia.

The average crystal size is about 1 micron. The product formed according to the herein-claimed process is very pure, the yields are high and the crystalline portion of the resulting product is about 90%.

Figure 2:
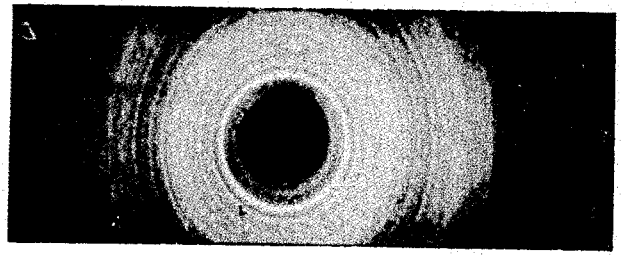

The difference between zinc-ethylene-bis-dithiocarbamate of the prior art and of this invention is illustrated in the accompanying Debye-Scherrer X-ray refraction diagrams; FIG. 1 representing the X-ray refraction diagram of the prior art compound, and FIG. 2 representing the crystalline zinc-ethylene-bis-dithiocarbamate of this invention.

The reduction in operation steps, the recovery of a crystalline instead of an amorphous product and the particularly critical fact that zinc-ethylene-bis-dithiocarbamate is substantially aqueously insoluble, greatly increase the utility of this product as a phytotherapeutic agent in agriculture.

The following examples are presented to illustrate the present invention, without intent, however, to thereby limit the scope of the appended claims:

*Example 1*

After adding 30 cc. of water to 9.11 g. of ZnO (zinc white, commercial grade, 93.6% pure) in a 250 cc. glass flask and stirring the suspension for 10 minutes, 50 cc. of a 55.11% (by vol.) aqueous ammonium ethylene dithiocarbamate solution are added at room temperature while stirring, which is then continued for another 30 min. The reaction is slightly exothermic and the temperature rises from 21° C. to 29° C. at the end of the stirring period. The product is then washed twice by decantation with water, filtered and dried at 50° C. 31.4 g. of a white or ivory-white product are obtained, containing 89.25% Zn-ethylene-bis-dithiocarbamate, which represents a yield of 91%.

*Example 2*

After adding 30 cc. of water and 0.1 g. of sodium lignin sulfonate to 9.11 g. ZnO (zinc white, commercial grade, 93.6% pure) in a 250 cc. glass flask and stirring the suspension for 10 min., 50 cc. of a 55.11% (by vol.) aqueous ammonium ethylene dithiocarbamate solution are added at room temperature while stirring, which is then continued for another 30 minutes. The reaction is slightly exothermic and the temperature rises from 21° C. to 29° C. at the end of the stirring period.

The product is then treated as in the foregoing example. 31.8 g. of zinc-ethylene-bis-dithiocarbamate are obtained, of 89.82% purity, representing a yield of 92.73%.

*Example 3*

After adding 30 cc. of water and 0.1 g. of sodium lignin sulfonate to 8.8 g. ZnO (zinc white, commercial grade, 93.6% pure) in a 250 cc. glass flask and stirring the suspension for 10 minutes, 50 cc. of a 49.8% (by vol.) aqueous ammonium ethylene dithiocarbamate solution and 5 cc. of a 25% aqueous ammonia solution are added at room temperature while stirring, which is then continued for another 30 minutes. The reaction is more exothermic than in the foregoing examples and the temperature rises, immediately at the start of the reaction, from 21° C. to about 32° C. The product is subsequently treated as in the foregoing examples and 29.5 g. of dry zinc-ethylene-bis-dithiocarbamate are obtained, containing 85.5% of the pure product and representing a yield of 90.6%.

*Example 4*

Into a 4-necked glass flask of 500 cc. capacity, provided with mechanical stirrer, reflux condenser, thermometer and separatory funnel, are entered 43.47 g. of ZnO (96.6% commercial grade zinc white).

After adding 250 cc. of water, containing 0.3 g. of sodium lignin sulfonate, and stirring the resulting suspension for 15 minutes, adding rapidly 82 g. of carbon disulfide, putting the separatory funnel in place, and continuing stirring for a few minutes, a mixture of 39 g. of ethylenediamine and 68 g. of a 25% (by weight) aqueous ammonia solution is added dropwise through the separatory funnel within the period of about 1 hour while stirring. The temperature tends to rise and is kept at about 30–35° C. by means of a water bath. Stirring is continued for three more hours and the product (zinc-ethylene-bis-dithiocarbamate), separated as in the previous examples and containing an excess of unreacted carbon disulfide, is washed twice by decantation, filtered and dried at 50° C.

*Example 5*

In order to illustrate the influence of $NH_4$-ions in the aqueous solution of ammonium-ethylene-bis-dithiocarbamate upon the properties of zinc-ethylene-bis-dithiocarbamate obtained, 5,000 cc. of a 48.5% ammonium-ethylene-bis-dithiocarbamate solution are prepared by reacting carbon disulfide with ammonia and ethylenediamine. A nitrogen stream is bubbled through the reaction mixture at the rate of 250 g./h. to remove part of the $NH_4$-ions present in form of $NH_3$.

Samples showing a different $NH_4$-ion content are taken at suitable time intervals according to the following scheme:

Sample 1 of the solution of ammonium-ethylene-bis-dithiocarbamate as such.

Sample 2 of the solution after treating with nitrogen for 30 minutes.

Sample 3 of the solution after treating with nitrogen for 1 hour.

Sample 4 of the solution after treating with nitrogen for 1 hour 30 min.

Sample 5 of the solution after treating with nitrogen for 2 hours.

The foregoing samples of ammonium-ethylene-bis-dithiocarbamate are reacted with stoichiometric quantities of zinc oxide under similar condition, and the reaction time necessary to obtain the zinc salt is measured in each case. The results indicate that the presence of an excess of $NH_4$-ions eventually remained during the preparation of the $NH_4$-salt lowers the reaction rate of ammonium-ethylene-bis-dithiocarbamate with ZnO and at the same time promotes the precipitation of crystalline zinc-ethylene-bis-dithiocarbamate.

In case 1, the reaction is completed after 30–35 minutes, in case 2 after 20–25 minutes, in case 3 after 15 min. and in cases 4 and 5 after 10–15 min.

While the zinc-ethylene-bis-dithiocarbamate obtained according to 1 and 2 is practically completely crystalline, a substantial portion of amorphous zinc-ethylene-bis-dithiocarbamate is present in the other cases.

I claim:

1. A heterogeneous phase process for preparing crystalline zinc-ethylene-bis-dithiocarbamate which comprises reacting, at a temperature not higher than about 35° C. and while intimately mixing, an aqueous solution of ammonium ethylene bis-dithiocarbamate with a member of the group consisting of zinc oxide, zinc oxide hydrate and zinc hydroxide, suspended in finely divided state in said solution, and separating, washing and drying the solid portion of the reaction mixture.

2. The process according to claim 1, wherein said reaction is carried out in the presence of sodium lignin sulthe stoichiometric amount of ammonium ions.

3. The process according to claim 1, wherein said reaction is carried out in the presence of sodium lignin sulfonate, constituting about 0.1% by weight of the reaction mixture.

4. A heterogeneous phase process for preparing crystalline zinc-ethylene-bis-dithiocarbamate which comprises reacting, while cooling to prevent temperature rise above about 35° C., and intimately stirring, an aqueous solution of about stoichiometric amounts of carbon disulfide, ethylene diamine and ammonia with zinc oxide suspended in finely divided state in said solution, and separating, washing and drying the solid portion of the reaction mixture.

5. A process for preparing white to ivory-white, crystalline zinc-ethylene-bis-dithiocarbamate comprising treating aqueous ammonium ethylene dithiocarbamate with a member of the group consisting of zinc oxide, zinc oxide hydrate, and zinc hydroxide, said member having a particle size not larger than about 20 microns, said member being in suspension in the aqueous reaction mixture.

6. A process for preparing white to ivory-white crystalline zinc-ethylene-bis-dithiocarbamate comprising treating aqueous ammonium ethylene dithiocarbamate with a member of the group consisting of zinc oxide, zinc oxide hydrate, and zinc hydroxide, said member having a particle size not larger than about 20 microns, said member being in suspension in the aqueous reaction mixture, the ammonium ion being in excess of the stoichiometric amount, the temperature being not higher than about 35° C.

7. A heterogeneous phase process for preparing zinc-ethylene-bis-dithiocarbamate, comprising treating, with stirring, an aqueous solution of carbon disulfide, ethylene diamine, and ammonia with a member of the group consisting of zinc oxide, zinc oxide hydrate, and zinc hydroxide.

8. A heterogeneous phase process for preparing zinc-ethylene-bis-dithiocarbamate, comprising treating, with stirring, an aqueous solution of carbon disulfide, ethylene diamine, and ammonia with a member of the group consisting of zinc oxide, zinc oxide hydrate, and zinc hydroxide, the exothermic rise in temperature being controlled by cooling to prevent rise above about 35° C.

9. A heterogeneous phase process for preparing zinc-ethylene-bis-dithiocarbamate, comprising treating, with stirring, an aqueous solution of carbon disulfide, ethylene diamine, and ammonia with a member of the group consisting of zinc oxide, zinc oxide hydrate, and zinc hydroxide, the exothermic rise in temperature being controlled by cooling to prevent rise above about 35° C., the said member having a particle size not larger than about 20 microns.

10. A heterogeneous phase process for preparing zinc-ethylene-bis-dithiocarbamate, comprising treating, with stirring, an aqueous solution of carbon disulfide, ethylene diamine, and ammonia with a member of the group consisting of zinc oxide, zinc oxide hydrate, and zinc hydroxide, the exothermic rise in temperature being controlled by cooling to prevent rise above about 35° C., the said member having a particle size not larger than about 20 microns, the ammonium ion being in excess of the stoichiometric amount.

References Cited in the file of this patent

UNITED STATES PATENTS

| | | |
|---|---|---|
| 2,229,562 | Gracia | Jan. 21, 1941 |
| 2,480,564 | Forney | Aug. 30, 1949 |
| 2,545,948 | Flenner | Mar. 20, 1951 |
| 2,693,485 | Gobeil | Nov. 2, 1954 |
| 2,855,418 | Mugnier | Oct. 7, 1958 |

OTHER REFERENCES

Curtman: "Qualitative Chemical Analysis," p. 229, Section 2 (1932), Macmillan.